(12) United States Patent
Pirzada et al.

(10) Patent No.: US 7,573,833 B2
(45) Date of Patent: Aug. 11, 2009

(54) NETWORK PRESENCE STATUS FROM NETWORK ACTIVITY

(75) Inventors: Shamim S. Pirzada, San Jose, CA (US); Dale J. Seavey, Sunol, CA (US); Peter M. Gits, Clarendon Hills, IL (US); Cullen F. Jennings, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 645 days.

(21) Appl. No.: 11/111,205

(22) Filed: Apr. 21, 2005

(65) Prior Publication Data

US 2006/0239200 A1   Oct. 26, 2006

(51) Int. Cl.
*G01R 31/08* (2006.01)
*G06F 11/00* (2006.01)
*G08C 15/00* (2006.01)
*H04J 1/16* (2006.01)
*H04L 12/26* (2006.01)
*H04L 12/28* (2006.01)

(52) U.S. Cl. ...................... 370/252; 709/224
(58) Field of Classification Search ................. 370/252; 709/224, 201, 223–225, 229, 206
See application file for complete search history.

(56) References Cited

U.S. PATENT DOCUMENTS

| 5,365,514 A | 11/1994 | Hershey et al. ............... 370/17 |
| 5,375,070 A | 12/1994 | Hershey et al. ............. 364/550 |
| 6,463,471 B1 | 10/2002 | Dreke et al. ................. 709/224 |
| 6,510,452 B1 | 1/2003 | Brisebois et al. ............ 709/204 |
| 6,651,099 B1 | 11/2003 | Dietz et al. ................. 709/224 |
| 6,662,015 B2 | 12/2003 | Furlong .................... 455/456.5 |
| 6,665,725 B1 | 12/2003 | Dietz et al. ................. 709/230 |
| 6,708,212 B2 * | 3/2004 | Porras et al. ................ 709/224 |
| 6,738,809 B1 | 5/2004 | Brisebois et al. ............ 709/224 |
| 6,789,116 B1 | 9/2004 | Sarkissian et al. ........... 709/224 |
| 2002/0120697 A1 * | 8/2002 | Generous et al. ............ 709/206 |
| 2002/0188864 A1 | 12/2002 | Jackson ..................... 713/201 |
| 2003/0009530 A1 | 1/2003 | Philonenko et al. ......... 709/206 |
| 2003/0172167 A1 * | 9/2003 | Judge et al. ................. 709/229 |
| 2003/0217099 A1 | 11/2003 | Bobde et al. ................ 709/202 |
| 2004/0172466 A1 | 9/2004 | Douglas et al. ............. 709/224 |
| 2004/0199630 A1 | 10/2004 | Sarkissian et al. .......... 709/224 |
| 2004/0215975 A1 | 10/2004 | Dudfield et al. ............. 713/201 |
| 2004/0250134 A1 | 12/2004 | Kohler, Jr. et al. .......... 713/201 |
| 2005/0021485 A1 | 1/2005 | Nodelman et al. ............ 706/21 |
| 2005/0021645 A1 | 1/2005 | Kulkarni et al. ............. 709/206 |

\* cited by examiner

*Primary Examiner*—Ricky Ngo
*Assistant Examiner*—David Oveissi
(74) *Attorney, Agent, or Firm*—Baker Botts L.L.P.

(57) ABSTRACT

A system for monitoring connectivity status includes network traffic transport entities and an aggregation server. The network traffic transport entities transport network traffic and are able to monitor a portion of the network traffic, access one or more network traffic alert rules, apply the network traffic alert rules to the portion of the network traffic, and determine whether an alert is required based on the application of the network traffic alert rules. The network traffic transport entities are also able to, in response to a determination that an alert is required, generate an alert message. The aggregation server is able to maintain a connectivity status profile, receive the alert message from the network traffic transport entity, identify a matching one of the communication devices in the connectivity status profile, determine an updated network connectivity status for the matching communication device, and update the connectivity status for the matching communication device.

31 Claims, 2 Drawing Sheets

NETWORK PRESENCE STATUS FROM NETWORK ACTIVITY

TECHNICAL FIELD OF THE INVENTION

The present invention relates generally to identifying network presence and, more particularly, to identifying network presence status based on network activity.

BACKGROUND OF THE INVENTION

Network system users interact and communicate using various types of network devices such as desktop computers, laptop computers, personal digital assistants, desktop phones, and cell phones. Systems and methods have been developed to determine whether certain network system users are connected to a network and available for communication through one or more of those network devices. Generally, knowledge of a network system user's network status and availability is referred to as "presence."

SUMMARY OF THE INVENTION

In accordance with the present invention, techniques for identifying network presence from network activity are provided. According to some embodiments, these techniques can enable detection of presence status based on the characteristics of network traffic generated by one or more network communication devices associated with a system user.

According to a particular embodiment, a system for monitoring connectivity status comprises one or more network traffic transport entities and an aggregation server. Each network traffic transport entitity transports network traffic and is able to monitor a portion of the network traffic, access one or more network traffic alert rules each associated with traffic characteristics indicative of network status for a communication device, apply the network traffic alert rules to the portion of the network traffic, and determine whether an alert is required based on the application of the network traffic alert rules. Each network traffic transport entity is also able to, in response to a determination that an alert is required, generate an alert message comprising a device identifier associated with the portion of the network traffic and traffic characteristics for the portion of the network traffic. The aggregation server is able to maintain a connectivity status profile. The connectivity status profile indicates, for one or more communication devices associated with a network system user, a connectivity status for the communication device. The aggregation server is also able to receive the alert message from the network traffic transport entity, identify a matching one of the communication devices in the connectivity status profile based on the device identifier in the alert message, determine an updated network connectivity status for the matching communication device based on the traffic characteristics in the alert message, and update the connectivity status for the matching communication device using the updated network connectivity status.

Embodiments of the invention provide various technical advantages. For example, these techniques may allow subscribers to obtain more accurate and more reliable information regarding the connectivity of one or more network system users. As another example, these techniques may allow subscribers to obtain more precise location information for one or more network system users. The information regarding the one or more network system users may be generated and updated to reflect substantially real-time changes in a system user's status. In addition, these techniques may allow network system users to identify varying levels of connectivity profile access for individual subscribers or for groups of subscribers. Furthermore, these techniques may allow network system users to override existing connectivity status logic and control the connectivity status information, regarding that network system user, that is transmitted to subscribers.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

Figure 1:
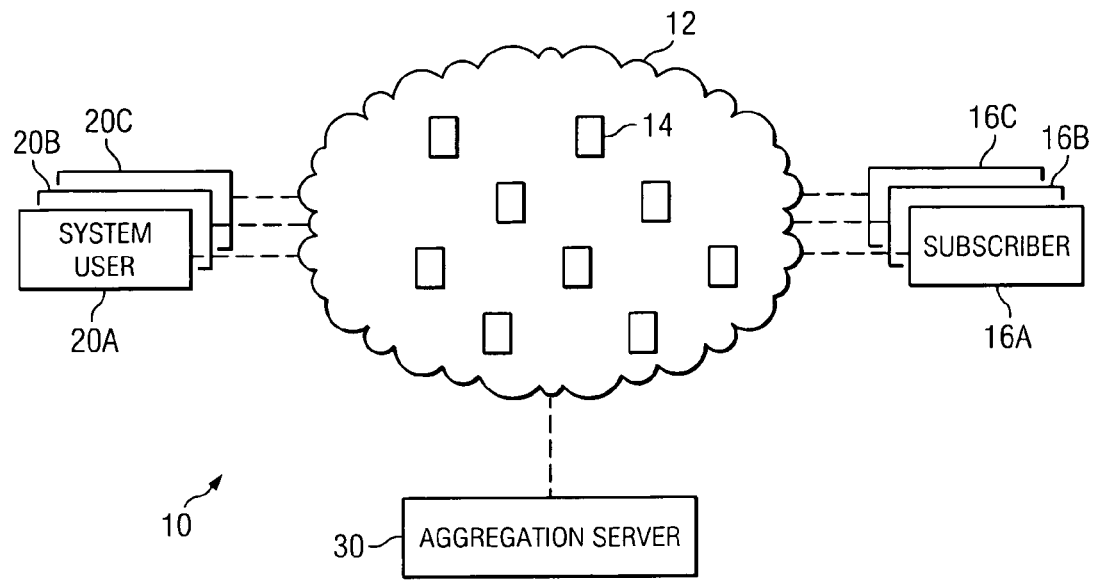
FIG. 1 illustrates a networking system having elements to support the identification and update of a network system user's connectivity status profile.

FIG. 1 illustrates a network connectivity system, indicated generally at 10, that includes network 12, subscriber 16, network system user 20, and aggregation server 30. The elements of network connectivity system 10 can operate to determine connectivity status for network system user 20 based on network traffic generated by one or more communication devices associated with network system user 20. Network connectivity system 10 can then update a connectivity status profile for network system user 20 based on the determined connectivity status. Network connectivity system 10 can also selectively enable subscriber 16 to access the connectivity status profile for network system user 20 to determine the connectivity status of network system user 20. Using this connectivity status, subscriber 16 may be able to make a more informed decision regarding the preferred application, protocol, and/or communication device to use to communicate with network system user 20.

Network 12 represents communication equipment, including hardware and any appropriate controlling logic, for interconnecting elements coupled to network 12. Thus network 12 may represent a local area network (LAN), a metropolitan area network (MAN), a wide area network (WAN), and/or any other appropriate form of network. Furthermore, elements within network 12 may utilize circuit-switched and/or packet-based communication protocols to provide for network communications. The elements within network 12 may be connected together via a plurality of fiber-optic cables, coaxial cables, twisted-pair lines, and/or other physical media, for transferring communications signals. The elements within network 12 may also be connected together through wireless transmissions, including infrared transmissions, 802.11 protocol transmissions, laser line-of-sight transmissions, or any other wireless transmission method.

Among the elements of network 12, there are a plurality of network traffic transport entities 14. Network traffic transport entities 14 represent hardware and appropriate controlling logic for transporting network traffic through network 12. For example, network traffic transport entities 14 may include routers, switches, and/or other suitable network elements. Network traffic transport entities 14 include a plurality of network interfaces and an internal fabric interconnecting the plurality of network interfaces. The fabric includes hardware and controlling logic within network traffic transport entity 14 operable to selectively interconnect the plurality of network interfaces.

In operation, in addition to transporting network traffic through network 12, network traffic transport entities 14 monitor the network traffic, select portions of the network traffic to analyze, identify certain aspects of the transported network traffic that may indicate a need to generate a network traffic alert message, and then generate network traffic alert messages for transmission to aggregation server 30. The network traffic alert messages contain information related to the network traffic, such as the type of information being transmitted through network 12, the volume of information being transmitted through network 12, the originating port information, and the target address for the network traffic. Network traffic transport entities 14, determine whether or not to generate and send a network traffic alert message based upon established network traffic alert rules. These network traffic alert rules may be contained in logic stored within network traffic transport entities 12. However, these network traffic alert rules may also be stored in aggregation server 30 and/or in other locations, and may be accessed remotely by network traffic transport entities 14. In addition, the network traffic alert rules may be frequently updated to reflect changes in network traffic or to correspond to different times of the day, week, month, year, etc. Furthermore, network traffic alert rules may be the same for every network traffic transport entity 14 within network 12, or network traffic transport entities 14 may be identified in groups of one or more, and each group may have different network traffic alert rules.

Network system user 20 represents one or more entities that communicate using one or more communication devices that transmit communication signals via network 12. These communications signals may support analog or digital voice communications, text messaging, electronic mail, video streams, or any other communication signals capable of transmission via network 12. In certain embodiments, these communications signals are transmitted using packet-based communication protocols. Network system user 20 may represent an individual, a group of individuals, or an application. For example, network system user 20 may represent an interactive agent application. In certain embodiments, each communication device, used by network system user 20, could be identified for association with network system user 20.

Aggregation server 30 represents hardware and controlling logic for collecting, processing, storing, and communicating user profile data. Aggregation server 30 couples to network 12 and operates to enable network connectivity monitoring and network connectivity status updating based upon network traffic.

Subscriber 16 represents an individual, or group of individuals, who has requested and/or has obtained permission to receive connectivity status information for one or more network system users 20. Subscriber 16 receives or accesses connectivity status information for network system user 20 from aggregation server 30.

In operation, network system user 20 sends communication signals, via network 12, using one or more communication devices. In certain embodiments, these communication signals are transmitted using packet-based communication protocols. As these communication signals pass through network 12, they are received and transmitted by one or more network traffic transport entities 14. As these communication signals are received and transmitted by network traffic transport entities 14, network traffic transport entities 14 monitor these communication signals. Network traffic transport entities 14 select a portion of the monitored communications signals and analyze the selected portion. The analysis is based on a comparison of the selected portion of the monitored communication signals with established network traffic alert rules. If the communications signals satisfy the network traffic alert rules, then information related to the communications signals will be sent to aggregation server 30. The information sent to aggregation server 30 may include the originating port ID, MAC address, and/or IP Address, communication protocol, destination address, and any other information available to network transport entity 14 which may assist aggregation server 30 in determining the connectivity status of network system user 20.

Aggregation server 30 associates the information received from one or more network traffic transport entities 14 with one or more network system users 20. Aggregation server 30 then applies filtering methods and/or logic to the information received from one or more network traffic transport entities 14 in order to update the connectivity status of the one or more network system users 20. In addition, aggregation server 30 may identify which protocols and/or ports would be the preferred method for communicating with one or more network system users 20. The connectivity status information, updated by aggregation server 30, is available for access by, or delivery to, one or more subscribers 16.

In one embodiment, network traffic transport entity 14 selects a portion of network traffic using statistical sampling. The portion of the network traffic may be selected such that every nth packet is selected, where "n" is an established integer value established to control the sampling rate. The portion of the network traffic may also be randomly selected in order to eliminate the effects of routine patterns on the accuracy of the data.

In another embodiment, aggregation server 30 applies Bayesian filtering methods to analyze the network traffic alert messages and to determine the connectivity status of network system user 20.

According to particular embodiments, aggregation server may transmit different tiers of connectivity status information for a single network system user 20 to different subscribers 16. Network system user 20 may identify the different tiers of connectivity status information and identify which subscribers 16 may receive which tier of information. For example, Tier I may provide the greatest amount of connectivity status information and may be identified by the network system user 20 only for transmittal to subscribers 16 who are friends and family of network system user 20. In contrast, Tier II may be limited to connectivity status information during working hours on scheduled work days and may be identified by network system user 20 for transmittal to co-workers and close business contacts. Tier III, on the other hand, would only provide connectivity status information which would indicate whether or not network system user 20 is currently in the office or at their desk. As with Tier II, Tier III would only be available during working hours on scheduled work days. Network system user 20 may identify Tier III for transmittal to all subscribers 16.

Although network connectivity system 10 has been described as having three tiers of connectivity status information, network connectivity system 10 may have any number or connectivity status tiers and those tiers may be associated with any number of subscribers, based upon the preferences of network system user 20 or upon the preferences of one or more system administrators.

Although any network traffic generated by a communication device associated with network system user 20 may be interpreted by aggregation server 30 as indicating the current connectivity status of network system user 20, some forms of network traffic indicate a higher probability of the current connectivity status of network system user 20 than others. For example, any form of network traffic, which is automatically generated by an application running on a communication device, is a poor indicator of network system user connectivity status. In contrast, any form of network traffic which may be associated with physical activity on the part of network system user 20, is generally considered a good indicator of connectivity status. A partial list of types of network traffic which may be considered as good indicators of connectivity status include:

Telnet sessions
  a Outgoing SMTP e-mail traffic
  Outgoing instant messages
  Signaling traffic related to real-time communication protocols (such as H.323, SCCP, SIP, etc.)
  Outbound HTTP traffic, especially outside of the local domain
  Outbound FTP traffic
  Printing protocol traffic (e.g. LPQ, IMPP, VPN, IP-Sack, SSH VPN, GRE VPN, etc.)
  Network traffic indicating a telephone key press, or an on-hook/off-hook signal change
  For a Wi-Fi network, any network traffic indicating physical movement of the wireless device, such as a change in the wireless hub registrations
  Any traffic indicating that a wireless device has just been docked or undocked, such as a query for a software update or an indicative change in connection speed In certain embodiments, different priorities levels may be assigned to different types of traffic to develop an overall scheme for determining connectivity status with greater accuracy. Priority levels may be different for each network system user 20, for each communication device, and/or for different times of the day, week, month, or year. In addition, different priority levels may be determined through the use of learning filters, such as Bayesian filters. In one embodiment, learning filters may be used to identify certain types of traffic that indicate a high probability of physical presence by network system user 20. For example, HTTP traffic directed to certain websites may indicate a high probability of physical presence, whereas other HTTP traffic may be associated with traffic generated by a web robot or by another network system user 20. These methods may be especially useful in situations where more than one network system user 20 is associated with a single communication device.

Figure 2:
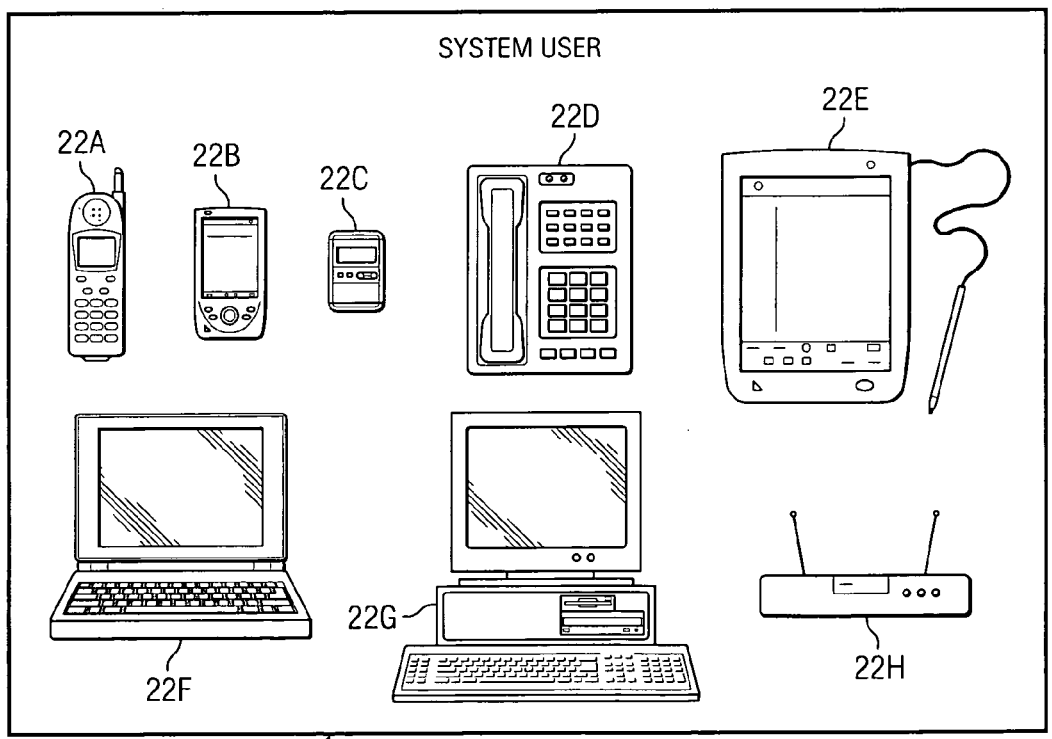
FIG. 2 illustrates communication devices associated with a network system user.

FIG. 2 illustrates communication devices 22 associated with network system user 20. Communication devices 22 represent one or more of a plurality of hardware devices capable of transmitting electronic communication signals through network 12. Communications devices 20 may include cell phones 22A, personal digital assistants 22B, two-way pagers 22C, desk phones 22D, tablet computers 22E, laptop computers 22F, desktop computers 22G, television set-top boxes 22H, and/or any other hardware device capable of transmitting communication signals through network 12.

Each communication device 22 connects to network 12 through one or more appropriate wireless or wireline protocols. For example, communication device 22 may connect using one or more mobile communications technologies, such as global systems for mobile communications (GSM) and/or code division multiple access (CDMA). Furthermore, communication devices 22 may support packet based protocols such as Internet protocol (IP) and wireless standards such as the 802.11 family of wireless standards. In certain embodiments, network system user may be associated with numerous communication devices 22, all of which transmit communication signals through network 12.

In operation network system user 20 connects to network 12 through one or more network communication devices 22. In some instances, network system user 20 may be connected to network 12 using multiple communication devices 22 simultaneously. For example, network system user 20 may simultaneously be working on a desktop computer, talking on a desktop phone, and receiving a call on a cellular phone. Network traffic from each of these devices may be used to determine the connectivity status of network system user 20.

Figure 3:
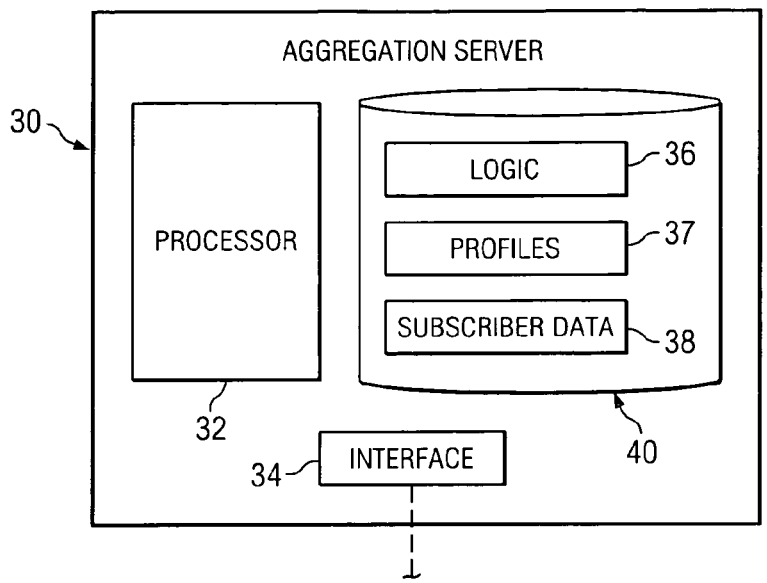
FIG. 3 is a block diagram illustrating functional components of an aggregation server associated with the network connectivity system.

FIG. 3 is a block diagram illustrating functional components of aggregation server 30. In the embodiment illustrated, aggregation server 30 includes processor 32, network interface 34, and memory 40. These components operate to enable aggregation server 30 to receive and analyze network traffic alert messages, maintain and update connectivity status profiles, determine subscriber access, and transmit connectivity status profile information.

Processor 32 controls the operation and administration of elements within aggregation server 30 by processing information received from network interface 34 and memory 40. Processor 32 includes any hardware and/or controlling logic elements operable to control and process information. For example, processor 32 may be a programmable logic device, a microcontroller, and/or any other suitable processing device.

Network interface 34 communicates information to and receives information from devices coupled to network 12. For example, network interface 34 may communicate with network traffic transport entities 14, subscriber 16, and network system user 20. Thus network interface 34 includes any suitable hardware and/or controlling logic used to communicate information to and from elements coupled to aggregation server 30.

Memory 40 stores, either permanently or temporarily, data and other information for processing by processor 32 and communication using network interface 34. Memory includes any one or a combination of volatile or nonvolatile local or remote devices suitable for storing information. For example, memory 40 may include random access memory (RAM), read only memory (ROM), magnetic storage devices, optical storage devices, or any other suitable information storage device or combination of these devices.

Memory 40 may store, among other things, connectivity status logic 36, connectivity status profiles 37, and subscriber data 38. Connectivity status logic 36 includes code, executable files, and/or appropriate software modules capable, when executed, of controlling the operation of aggregation server 30 as it relates to updating network system user connectivity profiles. Connectivity status logic 36 includes logic necessary to filter network traffic alerts and identify those network traffic alerts which indicate a need to update one or more network system user profiles. Connectivity status logic 36 also includes logic necessary to prioritize various network traffic alerts to determine which network traffic has the greatest probability of indicating the actual connectivity status of one or more network system users 20. Further, connectivity status logic may include network traffic alert rules used by network traffic transport entities 14 to analyze network traffic.

Connectivity status profiles 37 may include, for each network system user 20, addresses and protocols for each communication device 22, as well as current connectivity status, usage patterns, preferences, schedule information, and any other information that may assist aggregation server 30 in identifying the current connectivity status of network system user 20. Current connectivity status may include, for each communication device 22 associated with a network system user 20, whether the communication device is present on network 12. However, current connectivity status may include other information, such as the type of network traffic generated by communication device 22, the volume of network traffic generated by communication device 22, and the target addresses for network traffic generated by communication device 22.

Subscriber data 38 may include information identifying each subscriber 16, the connectivity status profiles 37 each subscriber 16 is authorized to access, and the type of profile information each subscriber 16 is authorized to access for each network system user 20. Subscriber data 38 may also include contact information for each subscriber 16, to allow aggregation server 30 to transmit updated connectivity status information to subscribers 16.

In certain embodiments, network system user 20 may be able to transmit information to aggregation server 30 and override the connectivity logic stored in memory 40. By overriding the connectivity logic in memory 40, network system user 20 may be able to establish either a more accurate or intentionally inaccurate connectivity profile. As one example, if network system user 20 does not want to be disturbed, he may send a do-not-disturb message to aggregation server 30. Upon receiving the do-not-disturb message, aggregation server 30 would update the connectivity profile for network system user 20 to indicate that network system user 20 is not currently connected, regardless of any actual network traffic generated by network system user 20. As another example, network system user 20 may send a message to aggregation server 30, indicating a preferred contact device. Upon receiving the message from network system user 20, aggregation server would update the connectivity profile for network system user 20 to indicate the preferred contact device for network system user 20, regardless of any actual traffic generated by other devices 22 associated with network system user 20.

In other embodiments, a network system user connectivity status profile may be randomized by aggregation server 30 in order to introduce an intended level of error in the connectivity profile. This intended error may ensure that subscribers 16 will be unable to readily determine the location, routine, or usage patterns of network system user 20. By introducing intended error into the connectivity profile, it may increase personal and/or network security, and decrease the likelihood that private information will unintentionally become public.

In yet other embodiments, network traffic generated by a communication device 22 associated with a first network system user 20A may be used to determine the connectivity status of a second network system user 20B. For example, if the first network system user 20A is sending communications data from a communications device within network 12 to the second network system user 20B, who is receiving the communications data through a communications device located outside of network 12, the network traffic may be used to determine the connectivity status of the second network system user 20B.

Figure 4:
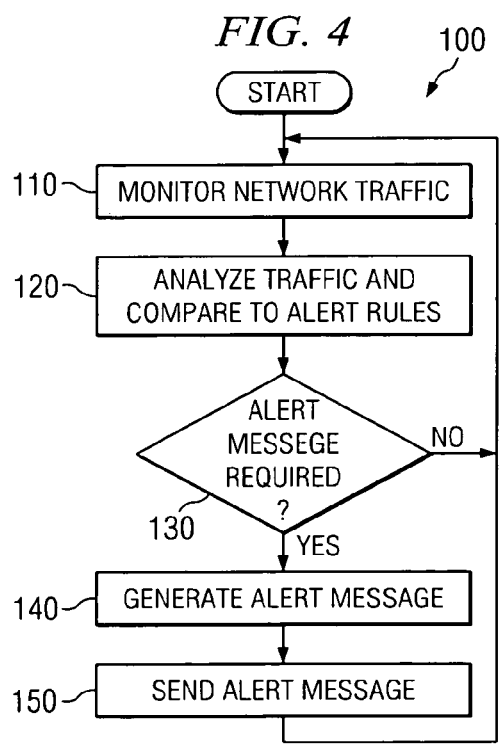
FIG. 4 is a flowchart illustrating a method for communicating network traffic alert messages.

FIG. 4 is a flowchart illustrating a method for communicating network traffic alert messages. Network traffic transport entity 14 monitors traffic through network 12, at step 110. Network traffic transport entity 14 then analyzes the network traffic and compares the network traffic to established alert rules, at step 120. Network traffic transport entity 14 determines, at step 130, whether a network traffic alert message is required. If a network traffic alert message is required, network traffic transport entity 14 generates a network traffic alert message, at step 140. Then, at step 150, network traffic transport entity 14 sends the network traffic alert message. After the network traffic alert message has been sent, at step 150, or if a traffic alert message is not required at step 120, network traffic transport entity 14 returns to the initial operation of monitoring network traffic, at step 110.

Figure 5:
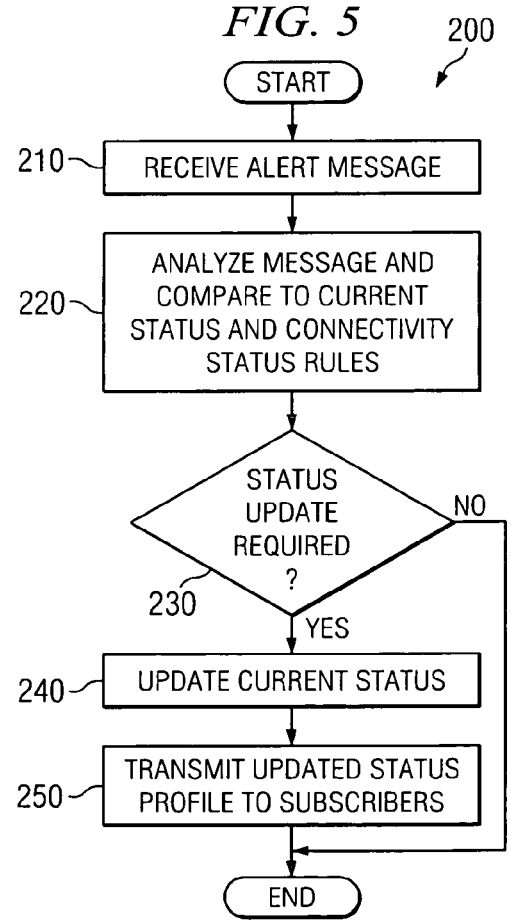
FIG. 5 is a flowchart illustrating a method for updating connectivity status profiles associated with network system users.

FIG. 5 is a flowchart illustrating a method for updating connectivity status profiles associated with network system users. Aggregation server 30 receives a network traffic alert message from network traffic transport entity 14, at step 200. Aggregation server 30 then analyzes the network traffic alert message and compares the network traffic alert message to current network system user profiles and established connectivity status rules, at step 210. Aggregation server 30 determines, at step 220, whether a connectivity profile status update is required. If a connectivity status update is required, aggregation server 30 updates the appropriate network system user connectivity profile, at step 230. Then, at step 240, aggregation server 30 transmits updated connectivity profile information to authorized subscribers 16.

Thus, methods 100 and 200 together represent a series of steps for updating a network system user's connectivity status based on network traffic. Methods 100 and 200 together represent an example of one mode of operation, and system 10 contemplates devices using any suitable techniques, elements and applications for performing this method of operation. Many of the steps in the flowchart may take place simultaneously and/or in a different order than shown. In addition, devices may use any methods with additional or fewer steps to identify connectivity status based on network traffic, so long as the methods remain appropriate. Moreover, other devices of system 10 may perform similar techniques to support the identification of connectivity status based on network traffic.

Although the present invention has been described in several embodiments, a myriad of changes and modifications may be suggested to one skilled in the art, and it is intended that the present invention encompass such changes and modifications as fall within the present appended claims.

What is claimed is:

1. A system for monitoring connectivity status comprising:
one or more network traffic transport entities each transporting network traffic and operable to:
monitor a portion of the network traffic for network traffic of a network system user on one or more communication devices associated with the network system user;
access one or more network traffic alert rules, each rule associated with traffic characteristics indicative of a network connectivity status for a communication device associated with the network system user;
apply the network traffic alert rules to the portion of the network traffic;
determine whether an alert is required based on the application of the network traffic alert rules; and generate an alert message comprising a device identifier associated with one of the one or more communication devices that is associated with the network system user; and an aggregation server operable to:

maintain a connectivity status profile for the network system user indicating the network connectivity status for the one or more communication devices associated with the network system user;

receive the alert message from the network traffic transport entity;

determine that one of the one or more communication devices associated with the network system user in the connectivity status profile matches the device identifier in the alert message; and update the network connectivity status for the matching communication device.

2. The system of claim 1, wherein the portion of the network traffic that is monitored is determined by statistical sampling.

3. The system of claim 1, wherein the network traffic alert rules comprise one or more of:

in response to detecting an outgoing e-mail message, send an alert message;

in response to detecting an outgoing instant message, send an alert message;

in response to detecting external HTTP traffic, send an alert message; and in response to detecting an outgoing SIP invite, send an alert message.

4. The system of claim 1, wherein the updated network connectivity status is determined using logical learning methods.

5. The system of claim 1, wherein the connectivity status is selected from the group consisting of: present and not present.

6. The system of claim 1, wherein the network traffic comprises one or more packets.

7. The system of claim 1, wherein the aggregation server is further operable to generate a connectivity status update notice.

8. The system of claim 7, wherein the aggregation server is further operable to identify one or more subscribers associated with the connectivity status profile and send the connectivity status update notice to the identified subscribers.

9. A computer-implemented method for monitoring connectivity status comprising:

monitoring a portion of network traffic for network traffic of a network system user on one or more communication devices associated with the network system user;

accessing one or more network traffic alert rules, each rule associated with traffic characteristics indicative of a network connectivity status for a communication device associated with the network system user;

applying the network traffic alert rules to the portion of the network traffic;

determining whether an alert is required based on the application of the network traffic alert rules; and generating an alert message comprising a device identifier associated with one of the one or more communication devices that is associated with the network system user; and maintaining a connectivity status profile for the network system user indicating the network connectivity status for the one or more communication devices associated with the network system user;

receiving the alert message;

determining that one of the one or more communication devices associated with the network system user in the connectivity status profile matches the device identifier in the alert message; and updating the connectivity status for the matching communication device.

10. The method of claim 9, wherein the portion of the network traffic that is monitored is determined by statistical sampling.

11. The method of claim 9, wherein the network traffic alert rules comprise one or more of:

in response to detecting an outgoing e-mail message, send an alert message;

in response to detecting an outgoing instant message, send an alert message;

in response to detecting external HTTP traffic, send an alert message; and in response to detecting an outgoing SIP invite, send an alert message.

12. The method of claim 9, wherein the updated network connectivity status is determined using logical learning methods.

13. The method of claim 9, wherein the connectivity status is selected from the group consisting of: present and not present.

14. The method of claim 9, wherein the network traffic comprises one or more packets.

15. The method of claim 9, further comprising generating a connectivity status update notice.

16. The method of claim 15, further comprising identifying one or more subscribers associated with the connectivity status profile and sending the connectivity status update notice to the identified subscribers.

17. Software for monitoring connectivity status comprising, embodied in a computer readable medium and, when executed using one or more processors, operable to:

monitor a portion of network traffic for network traffic of a network system user on one or more communication devices associated with the network system user;

access one or more network traffic alert rules, each rule associated with traffic characteristics indicative of a network connectivity status for a communication device associated with the network system user;

apply the network traffic alert rules to the portion of the network traffic;

determine whether an alert is required based on the application of the network traffic alert rules; and generate an alert message comprising a device identifier associated with one of the one or more communications devices that is associated with the network system user; and maintain a connectivity status profile for the network system user indicating the network connectivity status for the one or more communication devices associated with the network system user;

receive the alert message;

determine that one of the one or more communication devices associated with the network system user in the connectivity status profile matches the device identifier in the alert message; and update the network connectivity status for the matching communication device.

18. The software of claim 17, wherein the portion of the network traffic that is monitored is determined by statistical sampling.

19. The software of claim 17, wherein the network traffic alert rules comprise one or more of:

in response to detecting an outgoing e-mail message, send an alert message;

in response to detecting an outgoing instant message, send an alert message;

in response to detecting external HTTP traffic, send an alert message; and in response to detecting an outgoing SIP invite, send an alert message.

20. The software of claim 17, wherein the updated network connectivity status is determined using logical learning methods.

21. The software of claim 17, wherein the connectivity status is selected from the group consisting of: present and not present.

22. The software of claim 17, wherein the network traffic comprises one or more packets.

23. The software of claim 17, further operable to generate a connectivity status update notice.

24. The software of claim 23, further operable to identify one or more subscribers associated with the connectivity status profile and send the connectivity status update notice to the identified subscribers.

25. A system for monitoring connectivity status comprising:

a means for monitoring a portion of network traffic for network traffic of a network system user on one or more communication devices associated with the network system user;

a means for accessing one or more network traffic alert rules, each rule associated with traffic characteristics indicative of a network connectivity status for a communication device associated with the network system user;

a means for applying the network traffic alert rules to the portion of the network traffic;

a means for determining whether an alert is required based on the application of the network traffic alert rules; and a means for generating an alert message comprising a device identifier associated with one of the one or more communication devices that is associated with the network system user; and a means for maintaining a connectivity status profile for the network system user indicating the network connectivity status for the one or more communication devices associated with the network system user;

a means for receiving the alert message;

a means for determining that one of the one or more communication devices associated with the network system user in the connectivity status profile matches the device identifier in the alert message; and a means for updating the connectivity status for the matching communication device.

26. The system of claim 1, wherein the aggregation server is further operable to:

receive a connectivity status message from the network system user; and update the network connectivity status for the network system user in accordance with the connectivity status message.

27. The system of claim 26, wherein the connectivity status message identifies one of the one or more communication devices associated with the network system user.

28. The system of claim 1, wherein monitoring the portion of network traffic comprises monitoring network traffic indicative of physical activity of the network system user on one or more communication devices associated with the network system user.

29. The system of claim 1, wherein the network system user is a first network system user; and the network traffic alert rules include rules for determining the connectivity status of a second network system user with whom the first network system user is connected.

30. The system of claim 1, wherein the network connectivity status is transmitted to a subscriber based on a tier associated with the subscriber, wherein each tier provides a different amount of connectivity status information.

31. The system of claim 1, wherein a priority level may be assigned to different types of network traffic, the priority level indicative of a probability of physical activity of the network system user on one or more communications devices associated with the network system user.

* * * * *

UNITED STATES PATENT AND TRADEMARK OFFICE
CERTIFICATE OF CORRECTION

PATENT NO. : 7,573,833 B2  Page 1 of 1
APPLICATION NO. : 11/111205
DATED : August 11, 2009
INVENTOR(S) : Pirzada et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1122 days.

Signed and Sealed this

Seventh Day of September, 2010

David J. Kappos
*Director of the United States Patent and Trademark Office*